United States Patent
Edwards et al.

(10) Patent No.: US 12,443,922 B2
(45) Date of Patent: Oct. 14, 2025

(54) SYSTEM AND METHOD FOR WAREHOUSE PICKING USING TOTE CONTAINERS

(71) Applicant: Walmart Apollo, LLC, Bentonville, AR (US)

(72) Inventors: James Benjamin Edwards, Centerton, AR (US); Brian C. Roth, Bentonville, AR (US); Paul E. Durkee, Centerton, AR (US)

(73) Assignee: Walmart Apollo, LLC, Bentonville, AR (US)

(*) Notice: Subject to any disclaimer, the term of this patent is extended or adjusted under 35 U.S.C. 154(b) by 0 days.

(21) Appl. No.: 18/667,030

(22) Filed: May 17, 2024

(65) Prior Publication Data
US 2024/0303599 A1    Sep. 12, 2024

Related U.S. Application Data (63) Continuation of application No. 17/762,807, filed as application No. PCT/US2020/051909 on Sep. 22, 2020, now abandoned.

(60) Provisional application No. 62/907,057, filed on Sep. 27, 2019.

(51) Int. Cl.
*G06Q 10/0875* (2023.01)
*B65G 1/137* (2006.01)
*G06Q 10/10* (2023.01)

(52) U.S. Cl.
CPC ....... *G06Q 10/0875* (2013.01); *B65G 1/1375* (2013.01)

(58) Field of Classification Search
CPC ... G06Q 10/0875; B65G 1/1375; B65G 1/137
USPC .......................................................... 705/29
See application file for complete search history.

(56) References Cited

U.S. PATENT DOCUMENTS

| | | | |
|---|---|---|---|
| 7,331,471 B1 | 2/2008 | Shakes | |
| 9,346,619 B1 | 5/2016 | O'Brien | |
| 9,561,587 B2 * | 2/2017 | Wellman | B25J 9/1664 |
| 9,694,977 B2 | 7/2017 | Aprea | |
| 9,751,693 B1 | 9/2017 | Battles | |
| 9,790,001 B2 | 10/2017 | Tubilla Kuri | |
| 2012/0330458 A1 * | 12/2012 | Weiss | B66F 9/063 |
| | | | 901/1 |
| 2014/0244026 A1 * | 8/2014 | Neiser | B65G 1/1378 |
| | | | 700/216 |

(Continued)

FOREIGN PATENT DOCUMENTS

WO    WO-2013126048 A1 *    8/2013    ............. B25J 15/06

OTHER PUBLICATIONS

International Search Report and Written Opinion for International Application No. PCT/US2020/051909, dated Jan. 12, 2021, 15 pages.

(Continued)

*Primary Examiner* — Garcia Ade
(74) *Attorney, Agent, or Firm* — Fitch, Even, Tabin & Flannery LLP (57) ABSTRACT

A parent tote container is segmented into smaller, child tote containers. Each of the child tote containers includes products that are commonly sold together and are removed from the tote containers at picker stations with the same type of picker mechanism. Items are moved from the child tote containers to a customer order tote container at a picker station.

20 Claims, 4 Drawing Sheets

(56) References Cited

U.S. PATENT DOCUMENTS

| | | | |
|---|---|---|---|
| 2016/0140488 A1 | 5/2016 | Lindbo | |
| 2016/0221187 A1* | 8/2016 | Bradski | B25J 9/1664 |
| 2017/0036798 A1 | 2/2017 | Prahlad | |
| 2018/0305123 A1* | 10/2018 | Lert, Jr. | G06V 40/20 |
| 2018/0354717 A1* | 12/2018 | Lindbo | G07F 11/1657 |
| 2022/0327480 A1 | 10/2022 | Edwards | |

OTHER PUBLICATIONS

U.S. Appl. No. 17/762,807; Non-Final Rejection mailed Oct. 10, 2023; (pp. 1-23).
U.S. Appl. No. 17/762,807; Notice of Allowance and Fees Due (PTOL-85) mailed Feb. 29, 2024; (pp. 1-11).

* cited by examiner

SYSTEM AND METHOD FOR WAREHOUSE PICKING USING TOTE CONTAINERS

CROSS-REFERENCE TO RELATED APPLICATION(S)

This application is a continuation of U.S. application Ser. No. 17/762,807 filed Mar. 23, 2022, which is a U.S. national phase application of PCT/US2020/051909, filed Sep. 22, 2020, designating the United States, which claims the benefit of U.S. Provisional Application No. 62/907,057 filed Sep. 27, 2019, which are all incorporated herein by reference in their entireties.

TECHNICAL FIELD

These teachings relate to the satisfaction of customer orders using picker stations to move items between tote containers.

BACKGROUND

In warehouses or other similar types of environments, picker stations move products from one tote container (or some other container) to another tote container (or some other container). The picker stations themselves use different mechanisms to perform the moving of products or items. For example, some picker stations use a suction mechanism (e.g., useful for moving cans) while other picker stations use mechanical finger-type arrangements to pick up and move other types of items.

In terms of on-line orders, items within each customer order can vary greatly as to what type of picker station is needed to move or retrieve the items. These items are also typically scattered across a warehouse. And, some orders may include relatively large numbers of items. All of this results in tote containers frequently being moved back and forth between picker stations. This, in turn, is inefficient resulting in the waste of various types of resources. The time needed to fulfill an order is also increased.

BRIEF DESCRIPTION OF DRAWINGS

The above needs are at least partially met through the provision of approaches for picking a customer order in a warehouse, wherein.

DETAILED DESCRIPTION

Generally speaking, the present approaches segment a parent tote container into smaller, child tote containers. All of the child totes in each parent tote container include products that are commonly sold together and are picked with the same type of picker mechanism (e.g., a suction mechanism or a mechanism that uses mechanical fingers). In so doing and when fulfilling orders, the overall number of movements of tote containers within, for example, a warehouse fulfillment facility, is minimized leading to more efficient operation and use of resources.

In aspects, the number of parent tote container transfers needed to fill a single customer order tote is minimized. This is accomplished, in examples, by maximizing the probability that more than one of the child tote containers will contain, for instance, SKUs within the same customer order and can be picked at the same pick station.

In some examples, there are only two pieces of information needed when deciding which items to group together in the parent tote: (1) whether these items can be picked at a single pick station (i.e. Pick Station 1). If the answer is affirmative, these items are candidates to be grouped together; if the answer is negative, they are not candidates to be grouped together. The other piece of information is: (2) within the candidate items that can be picked at Pick Station 1, which of these candidate items are most commonly sold together. Items that have the highest probability to be contained within a single order are grouped together first and the same process is continued with the remainder of the items. Using this approach, the possibility that one item will be picked into the customer tote container from the same parent tote container is maximized.

In aspects, a customer order is received, and a customer order tote container is obtained and used to collect the items to fulfill the order. Another tote container (the parent tote container) includes products that could potentially be used to satisfy the customer order by moving items from this tote container to the customer order tote container. During processing of the customer order, the parent tote container is sent to the robotic picker station related to that parent tote container's constituent child totes' picker requirements. For example, if each child sub-tote is stocked with items to be picked with a suction head, it is sent to a picker station with a suction head robot. The parent tote container and the customer order tote container are sent to a first robotic picker station for the first item(s) to be picked by the first item's designated pick method from the parent tote container to the customer order tote container. In some examples, once movement (transfer from the patent tote container to the child tote container) of items is completed at a picker station, both the parent tote container and the customer order tote container are then brought to a second robotic picker station for a second item (or items) to be picked by a second pick method. By grouping together the child tote containers that contain commonly co-purchased items and that also require the same pick type, the parent tote container will stay at a particular picker station for more than one pick cycle. This reduces the overall time for filling an order since tote movement as between different picker stations is minimized.

In many of these embodiments, a system comprises a parent tote container, a customer order tote container, a first robotic picker station, a second robotic picker station, and a control circuit. The parent tote container is divided into or holds multiple child tote containers, and each of the child tote containers is configured to hold products that are typically sold together and require the same product retrieval mechanism. The customer order tote container is utilized to receive items in fulfillment of a customer order.

The first robotic picker station comprises a first product retrieval mechanism of a first type. The first robotic picker station is configured to move first selected products that are in the customer order from the parent tote container to the customer order tote container. The second robotic picker station comprises a second product retrieval mechanism of a second type. The second robotic picker station is configured to move second selected products that are in the customer order from the parent tote container to the customer order tote container. The second type is different from the first type.

The control circuit is coupled to the first robotic picker station and the second robotic picker station. The control circuit is further configured to receive a customer order that indicates fulfillment products desired to be purchased by a customer. The control circuit is also configured to instruct that the parent tote container and the customer order tote container be moved to first robotic picker station. The control circuit is additionally configured to electronically instruct the first robotic picker station to place first selected ones of the fulfillment products from the customer order that require use the first product retrieval mechanism to be moved from the parent tote container to the child tote container.

The selection of products in the child tote containers of the parent tote container is determined first by selecting candidate products that can be picked at the first picker robotic picker station and not at the second robotic picker station, and from the candidate products, products that are typically sold together.

In aspects, the first product retrieval mechanism and the second product retrieval mechanism are a suction mechanism or include mechanical fingers. In other aspects, the first product retrieval mechanism and the second product retrieval mechanism depend upon a type of packaging and the type of packaging is glass, a cylinder, a bag, or a bottle. In still other aspects, the first product retrieval mechanism and the second product retrieval mechanism depend upon other physical characteristics of the product, and the other physical characteristics of the product are that the product includes a pull-tab or the product does not include a pull-tab.

In some examples, the products that are sold together dynamically change over time. In other examples, the first robotic picker station and the second robotic picker station are disposed in a warehouse.

In other examples, an automated vehicle moves the parent tote container and the customer tote container from the first robotic picker station to the second robotic picker station. In other examples, a conveyor belt may be used. Other examples are possible.

In others of these embodiments, a parent tote container is provided. The parent tote container is divided into or holds multiple child tote containers. Each of the child tote containers is configured to hold products that are typically sold together and require the same product retrieval mechanism.

A customer order tote container is also provided. The customer order tote container is utilized to receive items in fulfillment of a customer order.

A first robotic picker station is provided. The first robotic picker station comprises a first product retrieval mechanism of a first type. The first robotic picker station is configured to move first selected products that are in the customer order from the parent tote container to the customer order tote container.

A second robotic picker station is also provided. The second robotic picker station comprises a second product retrieval mechanism of a second type. The second robotic picker station is configured to move second selected products that are in the customer order from the parent tote container to the customer order tote container, and the second type is different from the first type.

At a control circuit, a customer order that indicates fulfillment products desired to be purchased by a customer is received. By the control circuit, the parent tote container and the customer order tote container are instructed to be moved to the first robotic picker station. By the control circuit, the first robotic picker station is electronically instructed to place first selected ones of the fulfillment products from the customer order that require use the first product retrieval mechanism to be moved from the parent tote container to the child tote container.

The selection of products in the child tote containers of the parent tote container is determined first by selecting candidate products that can be picked at the first picker robotic picker station and not at the second robotic picker station, and from the candidate products, products that are typically sold together.

Figure 1:
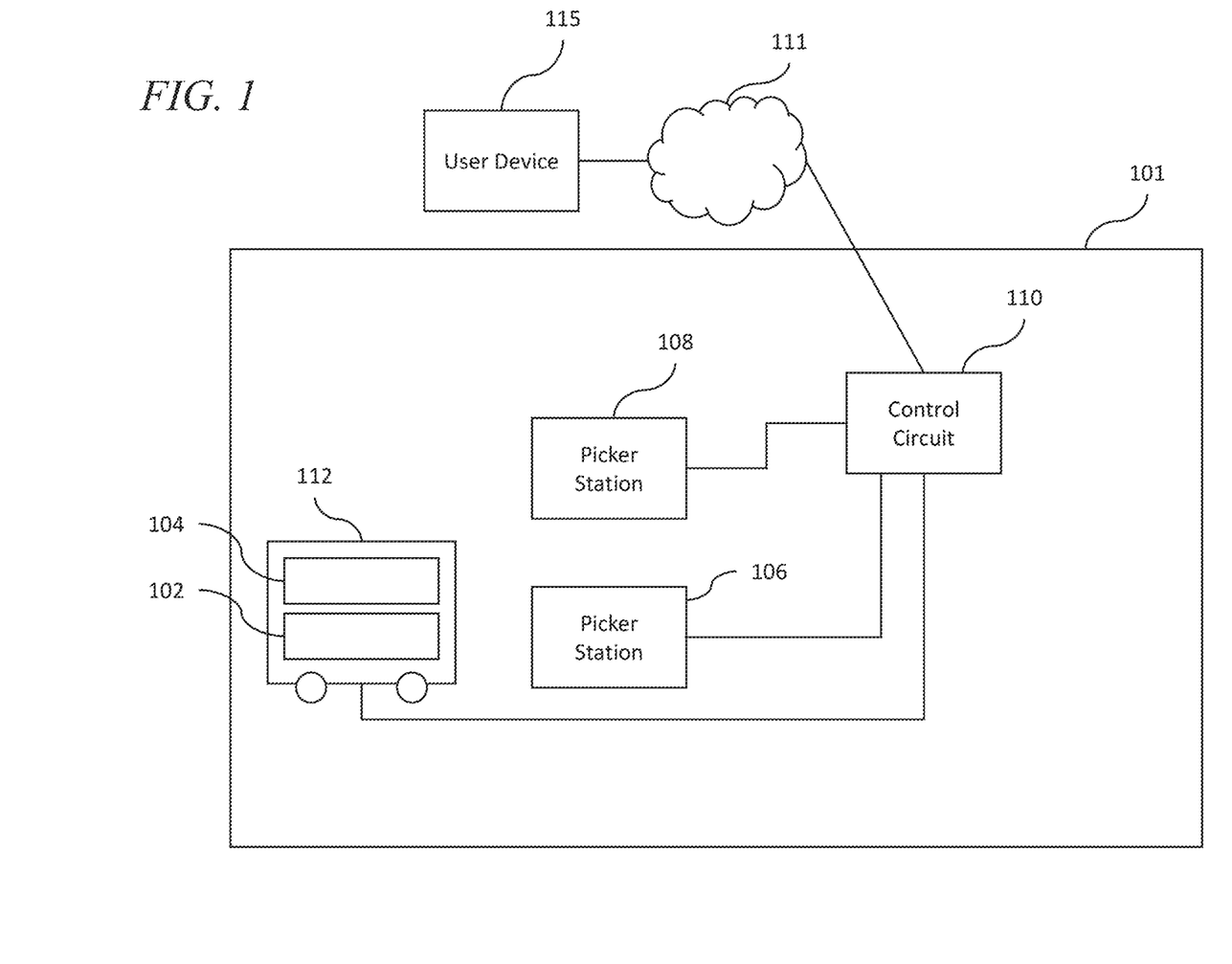
FIG. 1 comprises a diagram of a system as configured in accordance with various embodiments of these teachings.

Referring now to FIG. 1, a system 100 for fulfilling customer orders comprises a parent tote container 102, a customer order tote container 104, a first robotic picker station 106, a second robotic picker station 108, and a control circuit 110. Some or all of these elements may be disposed in a warehouse 101. The warehouse 101 may be any type of product storage facility used to fulfill customer orders. In other examples, the warehouse 101 may be a retail store, distribution center, or any other type of storage facility.

The parent tote container 102 is divided into or holds multiple child tote containers. Each of the child tote containers is configured to hold products that are typically sold together and require the same product retrieval mechanism. In these regards, the child tote containers may be inserted into the parent tote container (so that the number of child tote containers within the parent is a first number at a first time and a second number at a second time). In other examples, the number of child tote containers may stay the same, but various ones of the child totes can be rotated in-and-out of the parent tote container. In yet other examples, the parent tote container is permanently divided into various areas, portions, or compartments.

The customer order tote container 104 is utilized to receive items in fulfillment of a customer order. The customer order may be received at the control circuit 110 via an electronic network 111. A user electronic device 115 (e.g., a smart phone, personal computer, laptop, or tablet) may couple to the network 111 and allow customers to order items. The control circuit 110 may implement a website, which may be presented to or may be accessed by a customer at the user electronic device 110.

The first robotic picker station 106 comprises a first product retrieval mechanism of a first type. The first robotic picker station 106 is configured to move first selected products that are in the customer order from the parent tote container 102 to the customer order tote container 104. The second robotic picker station 108 comprises a second product retrieval mechanism of a second type. The second robotic picker station 108 is configured to move second selected products that are in the customer order from the parent tote container 102 to the customer order tote container 104, and the second type is different from the first type.

The first robotic picker station 106 and the second robotic picker station 108 are machines that are configured to move products from one position to another position (e.g., from one tote container to another tote container). In these regards, the first robotic picker station 106 and the second robotic picker station 108 include motors, arms, levers, and/or other mechanical parts to enable these actions to be accomplished. As mentioned, each of the first robotic picker station 106 and the second robotic picker station 108 include a product retrieval mechanism configured to hold, attach to, and/or move items. In one example, the retrieval mechanism is a suction mechanism where a suction action causes an item to become (temporarily) attached to the retravel mechanism (e.g., a suction cup). In another example, mechanical fingers are used to retrieve, hold, lift, and/or carry and item. Other examples of retrieval mechanisms are possible.

The control circuit 110 is coupled to the first robotic picker station 106 and the second robotic picker station 108. It will be appreciated that as used herein the term "control circuit" refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 110 may be configured (for example, by using corresponding programming stored in a memory as will be well understood by those skilled in the art) to carry out one or more of the steps, actions, and/or functions described herein.

The control circuit 110 is configured to receive a customer order (e.g., received from the user electronic device 115) that indicates fulfillment products desired to be purchased by a customer. The control circuit 110 is configured to instruct that the parent tote container 102 and the customer order tote container 104 be moved to first robotic picker station 106. This may be accomplished by a vehicle 112 (e.g., an automated vehicle such as an aerial drone or an automated ground vehicle). In other examples, the vehicle 112 may be a conveyor belt. In aspects, the vehicle 112 includes a control circuit and transceiver allowing the vehicle 112 to receive electronic instructions from the control circuit 110. In aspects, the control circuit 110 may be disposed locally at the warehouse 101, but in other aspects, the control circuit 110 may be disposed at a central location (e.g., a company headquarters or other central location) and send instructions to multiple warehouses. The control circuit 110 is configured to electronically instruct the first robotic picker station 106 to place first selected ones of the fulfillment products from the customer order that require use the first product retrieval mechanism to be moved from the parent tote container 102 to the child tote container 104.

In aspects, the first product retrieval mechanism and the second product retrieval mechanism are a suction mechanism or include mechanical fingers. In other aspects, the first product retrieval mechanism and the second product retrieval mechanism depend upon a type of packaging, and the type of packaging is, in examples, glass, cylinders, bags, or bottles. In still other aspects, the first product retrieval mechanism and the second product retrieval mechanism depend upon other physical characteristics of the product, and the other physical characteristics of the product are that the product includes a pull-tab or the product does not include a pull-tab.

In some examples, the products that are sold together dynamically change over time. As this occurs, the contents of the child tote containers within the parent tote container 102 are changed. It will be appreciated that robotic picker stations (e.g., the first robotic picker station 106 and the second robotic picker station 108) may initially load the parent tote container (and may also refill or replenish items within this container) at regular intervals or as needed.

It will be understood that the selection of products to be included within individual tote containers can be accomplished in a variety of different ways. For example, historical sales data may be analyzed to determine products that are sold together. This data may be combined or correlated with data showing products and retrieval mechanism for these products. Products commonly sold together (e.g., sold together in a greater than X % of transactions) and having the same required retrieval mechanism can be placed in a child tote. container. Further types of groupings are also possible.

In one particular example, cans of paint and paint thinner may be sold together more than a threshold number of times (e.g., 75%) and this can be determined by the analysis of historic sales data. Cans of paint and paint thinner may also utilize the same retrieval mechanism (e.g., suction). Consequently, cans of paint and paint thinner may be included in a child tote container that is inserted into or disposed within the parent tote container 102.

In aspects, the selection of products in the child tote containers 104 of the parent tote container 102 is determined first by selecting candidate products that can be picked at the first picker robotic picker station 106 and not at the second robotic picker station 108. From the candidate products, products that are typically sold together are then selected.

In another particular example, a bag of potato chips requires a robotic finger picking station, while cans of paint and paint thinner, and bottles of milk require a suction-type picker station. Paint and paint thinner are the only products commonly sold together. In this case, from the group of bags of potato chips, cans of paint, cans of paint thinner, and bottles of milk, the candidate products selected are cans of paint, cans of paint thinner, and bottles of milk. From this group, can of paint and paint thinner are selected for placement in a parent tote container (e.g., each in a separate child tote container) since they are commonly sold together.

Figure 2:
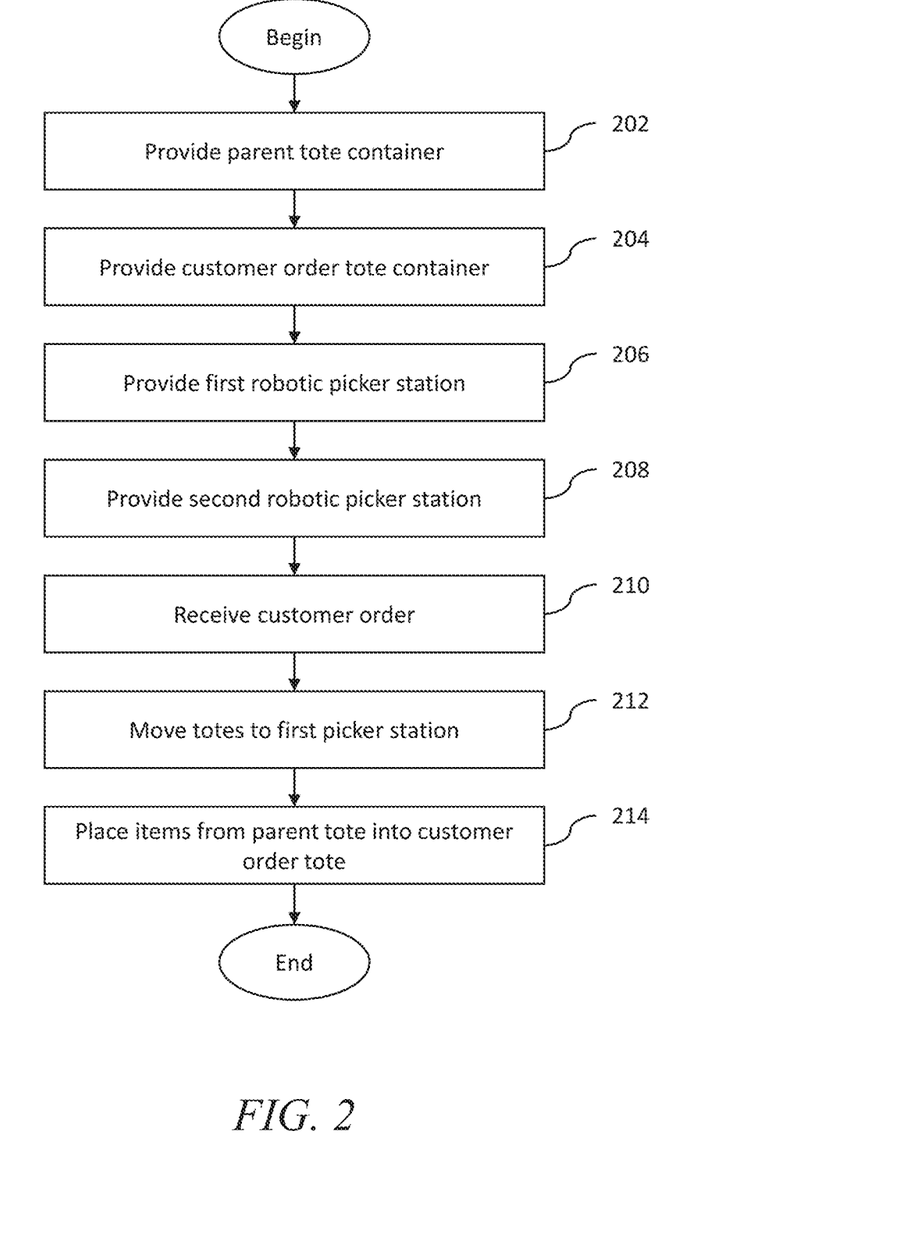
FIG. 2 comprises a flowchart as configured in accordance with various embodiments of these teachings.

Referring now to FIG. 2, an approach for fulfilling customer orders is described.

At step 202, a parent tote container is provided. The parent tote container is divided into or holds multiple child tote containers. Each of the child tote containers is configured to hold products that are typically sold together and require the same product retrieval mechanism.

At step 204, a customer order tote container is also provided. The customer order tote container is utilized to receive items in fulfillment of a customer order. The customer order tote container may also be divided into separate compartments, sections, or areas.

At step 206, a first robotic picker station is provided. The first robotic picker station comprises a first product retrieval mechanism of a first type. The first robotic picker station is configured to move first selected products that are in the customer order from the parent tote container to the customer order tote container.

At step 208, a second robotic picker station is provided. The second robotic picker station comprises a second product retrieval mechanism of a second type. The second robotic picker station is configured to move second selected products that are in the customer order from the parent tote container to the customer order tote container, and the second type is different from the first type.

At step 210 and at a central control circuit, a customer order that indicates fulfillment products desired to be purchased by a customer is received. For example, a customer may place an order using an electronic device that accesses a website via the internet. In one specific example, the customer may go to a company's website and electronically place the order.

At step 212 and by the central control circuit, the parent tote container and the customer order tote container are instructed to be moved to the first robotic picker station. The instructions may be sent in the form of electronic instructions to one or more vehicles that actually perform the moving of the containers between picking stations. In these regards, the vehicles may themselves have control circuits and transceivers (to receive the instructions from the central control circuit).

At step 214 and by the central control circuit, the first robotic picker station is electronically instructed to place first selected ones of the fulfillment products from the customer order that require use the first product retrieval mechanism to be moved from the parent tote container to the child tote container. The first robotic picker station may itself also include control circuits that control actuation or execution of the mechanical elements of the first robotic picker station. The selection of products in the child tote containers of the parent tote container is determined first by selecting candidate products that can be picked at the first picker robotic picker station and not at the second robotic picker station, and from the candidate products, products that are typically sold together. In some aspects, the parent tote container and/or the customer order tote container may be moved to the second robotic picker station when some of the products in the parent tote container require the use of the picking mechanism provided by the second picker station.

Figure 3:
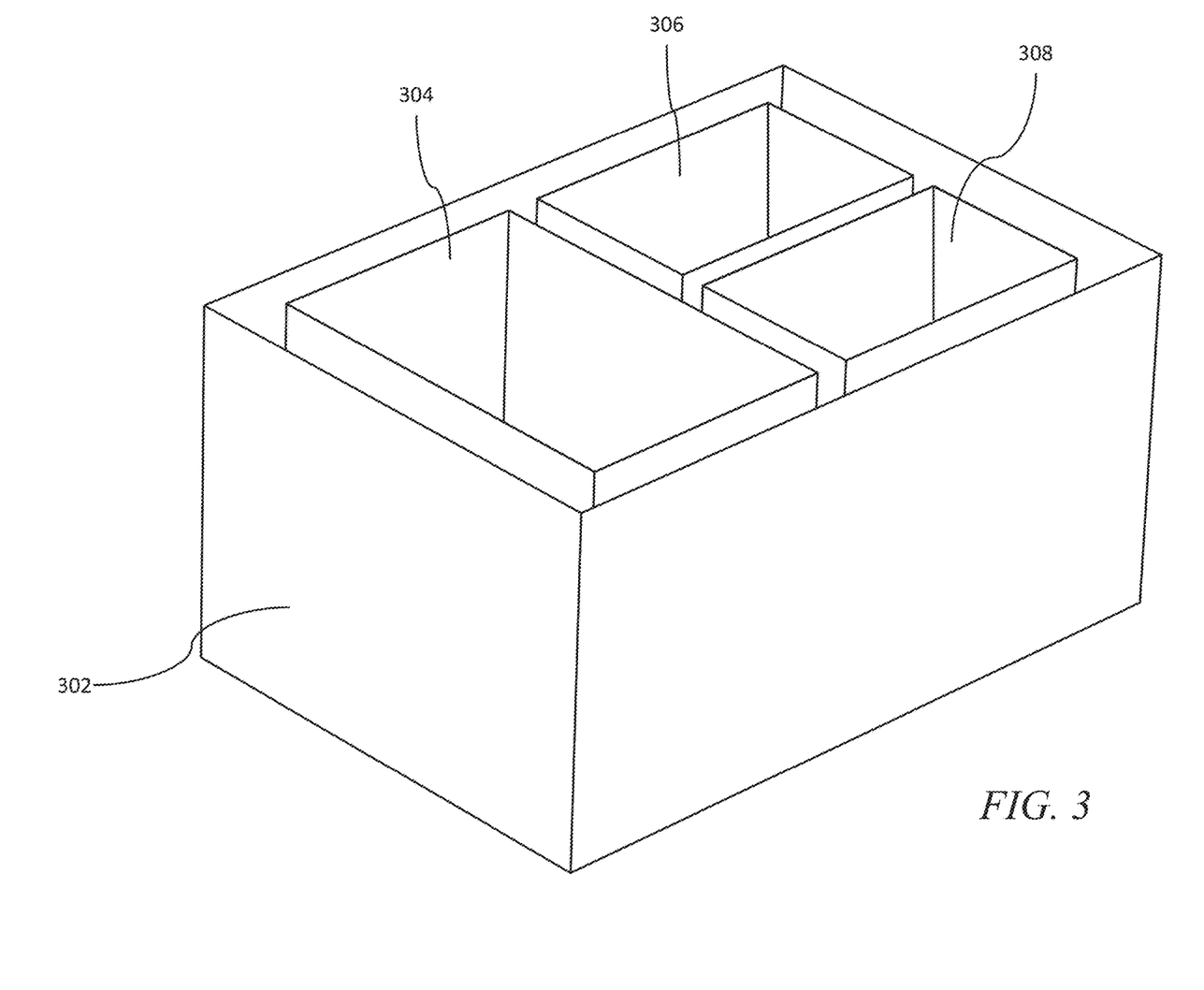
FIG. 3 comprises a diagram of a device in accordance with various embodiments of these teachings.

Referring now to FIG. 3, one example of a parent tote container 302 is described. The parent tote container 302 includes child tote containers 304, 306, and 308. Although three child tote containers are shown, it will be appreciated that any number of child tote containers may be included in the parent tote container 302. All of the tote containers may be constructed of any suitable material, such as metal or plastic. In other aspects, the child tote containers are removable from the parent tote container.

Each of the child totes containers 304, 306, and 308 includes products that are commonly sold together and are picked with the same type of picker mechanism (e.g., a suction mechanism or a mechanism that uses mechanical fingers). In one example, child tote container 304 has products that are sold together and utilize retrieval mechanism X; child tote container 306 has products that are sold together and utilize retrieval mechanism X; and child tote container 308 has products that are sold together and utilize retrieval mechanism X.

The selection of products to be included within individual child tote containers 304, 306, and 308 can be accomplished in a variety of different ways. For example, historical sales data may be analyzed to determine products that are sold together. This data may be combined or correlated with data showing products and retrieval mechanism for these products. Products commonly sold together (e.g., sold together in a greater than threshold number or percentage of transactions) and having the same required retrieval mechanism can be placed in a child tote container 304, 306, and 308. For example, products of the same type (e.g., having the same SKU number) with the same retrieval mechanism may each be placed in a separate child tote container (e.g., products with SKU 1 are placed in child tote container 304, products with SKU 2 are placed in child tote container 306, and products with SKU 3 are placed in child tote container 308). Once an assortment plan of products has been determined, the products are physically placed in the child tote containers 304, 306, and 308 (e.g., using any type of product placement or picking machine, or by a human), the child tote containers 304, 306, and 308 are placed in the parent tote container 302 (e.g., using any type of product placement or picking machine, or by a human), and then the customer order is fulfilled. In other aspects, each child tote container 304, 306, and 308 includes multiple types of products (e.g., products having multiple SKUs), but all products require the same picking mechanism type and are commonly sold together.

In still other examples, the selection of how to group products with a parent tote container or within child tote containers can also be based upon looking at other characteristics of products. In one example, the type of packaging can be examined (e.g., glass, bag, or bottle).

In still other aspects, still other features can then be examined (e.g., whether a can has a tab pull or not). This can be associated with a "pick type," which relates to the type of retrieval machinery needed. Then, an examination can be made as to what products are commonly sold together. Putting all this information together allows assignments of particular products or items to particular child tote containers.

In one particular example, cans of paint and paint thinner require the same type of pick station (e.g., suction-type). These products may be sold together more than a threshold number of times (e.g., 75%) and this can be determined by the analysis of historic sales data. For example, analysis of the data from one or more retail stores (where the data shows individual customer sales transactions) may indicate that over the previous year, two items were sold together greater than X % of these transactions. Consequently, cans of paint may be placed in child tote container 304 and paint thinner may be included in child tote container 306; both child tote containers 304 and 306 are inserted into the parent tote container 302. Customer orders can then be processed.

Figure 4:
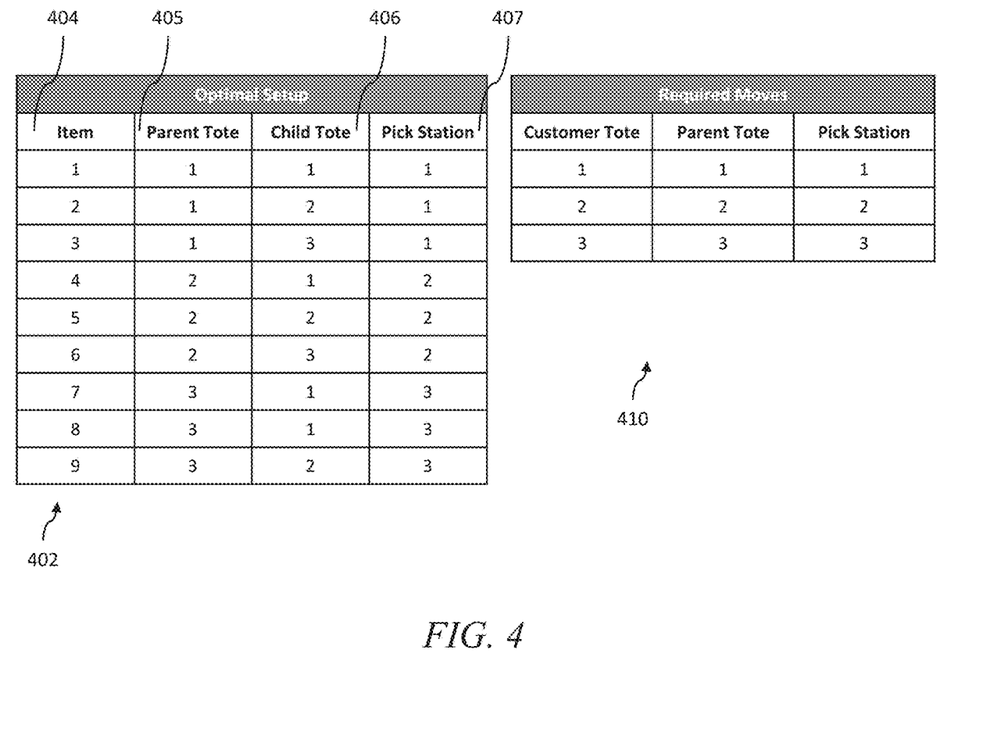
FIG. 4 comprises diagrams of organizational plans of parent tote containers and the resultant moves required between pick stations according to these organizational plans in accordance with various embodiments of these teachings.

Referring now to FIG. 4, another example of organizing tote containers is described. In some examples, there is a significant number of lines (e.g., items) in an order (e.g., 30 or more) requiring multiple customer order tote containers to fulfill an order. In the example of FIG. 4, an entire customer order tote container is filled at a single pick station and it will not be required to send a particular customer order tote container to multiple pick stations. In this example, assume that only three items can be fit into a customer order tote container. However, it will be appreciated that any number of items can be used. In these examples, items commonly sold together are placed in the same parent tote container.

One example of an optimal set-up or organization plan for parent tote containers is shown in table 402. As shown in this table, a first column 404 includes or identifies an item (there are 9 items). A second column 405 shows the parent tote container where an item is to be placed. A third column 406 illustrates the child tote container within the parent tote container where the item is to be placed. A fourth column 407 shows the pick station required to pick the item (i.e., the type of retrieval machinery needed to move the item from the child tote container within the parent tote container to the customer order tote container). Thus, the first row of table 402 indicates that item 1 is to be placed in a parent tote container 1, child tote container 1 and requires pick station 1 to be moved to a customer order tote container.

The required moves as between pick stations to satisfy an order including items 1-9 is shown in table 410. It can be seen that customer order tote container 1 does not have to move between pick stations (it stays at pick station 1 and never goes to the other pick stations to fulfill the order). Also, customer order tote container 2 does not have to move between pick stations (it stays at pick station 2). Finally, customer order tote container 3 does not have to move between pick stations (it stays at pick station 3). Even though three customer order tote containers are used, they do not have to be moved as between pick stations to fulfill the customer order. The parent tote containers 1, 2, and 3 also do not have to be moved as between pick stations. These results are accomplished because the parent tote containers exclusively include items requiring the same pick type be used (and these items commonly sell together as described elsewhere herein) and items of differing pick types are not spread across different tote containers. In this example, the parent tote containers stay at the pick station for more than one pick cycle (the pick cycle being the time of moving one product from the child tote container in the parent tote container to the customer order tote container).

It can be seen that using the approaches described herein, an entire customer order can be fulfilled by using a single customer order tote container and a single parent tote container at a single pick station. In other words, a single customer order tote and a single parent tote are moved to a pick station, and that pick station is able to fulfill the entire customer order due to the selection of products placed in the parent tote container. In other examples, more than one pick station may be needed to fulfill the order, but the movement of tote containers is still reduced compared to previous approaches and this occurs due to the product selection of the parent tote container according to the approaches described herein. This contrasts with other previous approaches where customer order totes and/or parent tote containers needed to be moved between a relatively large number of pick stations.

In some embodiments, one or more of the exemplary embodiments include one or more localized IoT devices and controllers (e.g., included with or associated with the various devices, vehicles, or picker stations described herein). In another aspect, the user electronic devices or automated vehicles may be seen as an IoT device. As a result, in an exemplary embodiment, the localized IoT devices and controllers can perform most, if not all, of the computational load and associated monitoring and then later asynchronous uploading of data can be performed by a designated one of the IoT devices to a remote server. In this manner, the computational effort of the overall system may be reduced significantly. For example, whenever localized monitoring allows remote transmission, secondary utilization of controllers keeps securing data for other IoT devices and permits periodic asynchronous uploading of the summary data to the remote server. In addition, in an exemplary embodiment, the periodic asynchronous uploading of data may include a key kernel index summary of the data as created under nominal conditions. In an exemplary embodiment, the kernel encodes relatively recently acquired intermittent data ("KRI"). As a result, in an exemplary embodiment, KRI includes a continuously utilized near term source of data, but KRI may be discarded depending upon the degree to which such KRI has any value based on local processing and evaluation of such KRI. In an exemplary embodiment, KRI may not even be utilized in any form if it is determined that KRI is transient and may be considered as signal noise. Furthermore, in an exemplary embodiment, the kernel rejects generic data ("KRG") by filtering incoming raw data using a stochastic filter that provides a predictive model of one or more future states of the system and can thereby filter out data that is not consistent with the modelled future states which may, for example, reflect generic background data. In an exemplary embodiment, KRG incrementally sequences all future undefined cached kernals of data in order to filter out data that may reflect generic background data. In an exemplary embodiment, KRG incrementally sequences all future undefined cached kernals having encoded asynchronous data in order to filter out data that may reflect generic background data. In a further exemplary embodiment, the kernel will filter out noisy data ("KRN"). In an exemplary embodiment, KRN, like KRI, includes substantially a continuously utilized near term source of data, but KRN may be retained in order to provide a predictive model of noisy data. In an exemplary embodiment, KRN and KRI, also incrementally sequences all future undefined cached kernels having encoded asynchronous data in order to filter out data that may reflect generic background data.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

The invention claimed is:

1. A system, the system comprising:
an automated vehicle;
a parent tote container, wherein the parent tote container is segmented into multiple child storage areas, each of the child storage areas configured to hold products, wherein the selection of products that are present in the child storage areas of the parent tote container are products that have been selected because the products are typically sold together in a single sales transaction with a single consumer;
a customer order tote container, the customer order tote container utilized to receive items from the parent tote container in fulfillment of a customer order;
wherein electronic instructions are formed at a first control circuit, and the electronic instructions are transmitted to and received by a second control circuit at the automated vehicle, wherein the automated vehicle responsively moves the parent tote container to and from a first picking station according to the electronic instructions to fulfill the customer order and wherein the customer order is fulfilled by moving products from the parent tote container to the customer order tote container.

2. The system of claim 1 wherein the child storage areas comprise child sub-totes.

3. The system of claim 1, wherein the first picking station includes a first product retrieval mechanism of a first type, the first product retrieval mechanism configured to move first selected products that are in the customer order from the parent tote container to the customer order tote container.

4. The system of claim 3, further comprising a second picking station wherein the second picking station comprises a second product retrieval mechanism of a second type, the second product retrieval mechanism of the second picking station being configured to move second selected products that are in the customer order from the parent tote container to the customer order tote container, wherein the second type is different from the first type and the first selected products are of a different type, form, and/or configuration than the second selected products.

5. The system of claim 4, wherein the first product retrieval mechanism and the second product retrieval mechanism are a suction mechanism or include mechanical fingers.

6. The system of claim 4, wherein the first product retrieval mechanism and the second product retrieval mechanism depend upon a type of packaging and the type of packaging is glass, cylinder, bag, or bottle.

7. The system of claim 4, wherein the first product retrieval mechanism and the second product retrieval mechanism depend upon other physical characteristics of the product, and the other physical characteristics of the product are that the product includes a pull-tab or the product does not include a pull-tab.

8. The system of claim 1, wherein the first picking station is disposed in a warehouse.

9. The system of claim 1, wherein the automated vehicle moves the parent tote container and the customer order tote container from the first picking station to a second picking station.

10. The system of claim 1, wherein the automated vehicle is an automated ground vehicle or an aerial drone.

11. A method, the method comprising:
providing an automated vehicle;
segmenting a parent tote container into multiple child storage areas, each of the child storage areas configured to hold products;
selecting and placing products that are typically sold together in a single sales transaction with a single consumer into the child storage areas of the parent tote container;
providing a customer order tote container, the customer order tote container utilized to receive items from the parent tote container in fulfillment of a customer order;
forming electronic instructions at first control circuit, and transmitting the electronic instructions to a second control circuit at the automated vehicle,
by the automated vehicle, moving the parent tote container to and from a first picking station according to the electronic instructions received at the second control circuit to fulfill the customer order and wherein the customer order is fulfilled by moving products from the parent tote container to the customer order tote container.

12. The method of claim 11 wherein the child storage areas comprise child sub-totes.

13. The method of claim 11, wherein the first picking station includes a first product retrieval mechanism of a first type, the first product retrieval mechanism configured to move first selected products that are in the customer order from the parent tote container to the customer order tote container.

14. The method of claim 13, further comprising providing a second picking station wherein the second picking station comprises a second product retrieval mechanism of a second type, the second product retrieval mechanism of the second picking station being configured to move second selected products that are in the customer order from the parent tote container to the customer order tote container, wherein the second type is different from the first type and the first selected products are of a different type, form, and/or configuration than the second selected products.

15. The method of claim 14, wherein the first product retrieval mechanism and the second product retrieval mechanism are a suction mechanism or include mechanical fingers.

16. The method of claim 14, wherein the first product retrieval mechanism and the second product retrieval mechanism depend upon a type of packaging and the type of packaging is glass, cylinder, bag, or bottle.

17. The method of claim 14, wherein the first product retrieval mechanism and the second product retrieval mechanism depend upon other physical characteristics of the product, and the other physical characteristics of the product are that the product includes a pull-tab or the product does not include a pull-tab.

18. The method of claim 11, further comprising disposing the first picking station in a warehouse.

19. The method of claim 11, wherein the automated vehicle moves the parent tote container and the customer order tote container from the first picking station to a second picking station.

20. The method of claim 11, wherein the automated vehicle is an automated ground vehicle or an aerial drone.

* * * * *